Sept. 11, 1928.
S. B. MAYHEW
1,683,834
SPITS USED IN PREPARING SALMON FOR BARBECUE
Filed Aug. 9, 1927
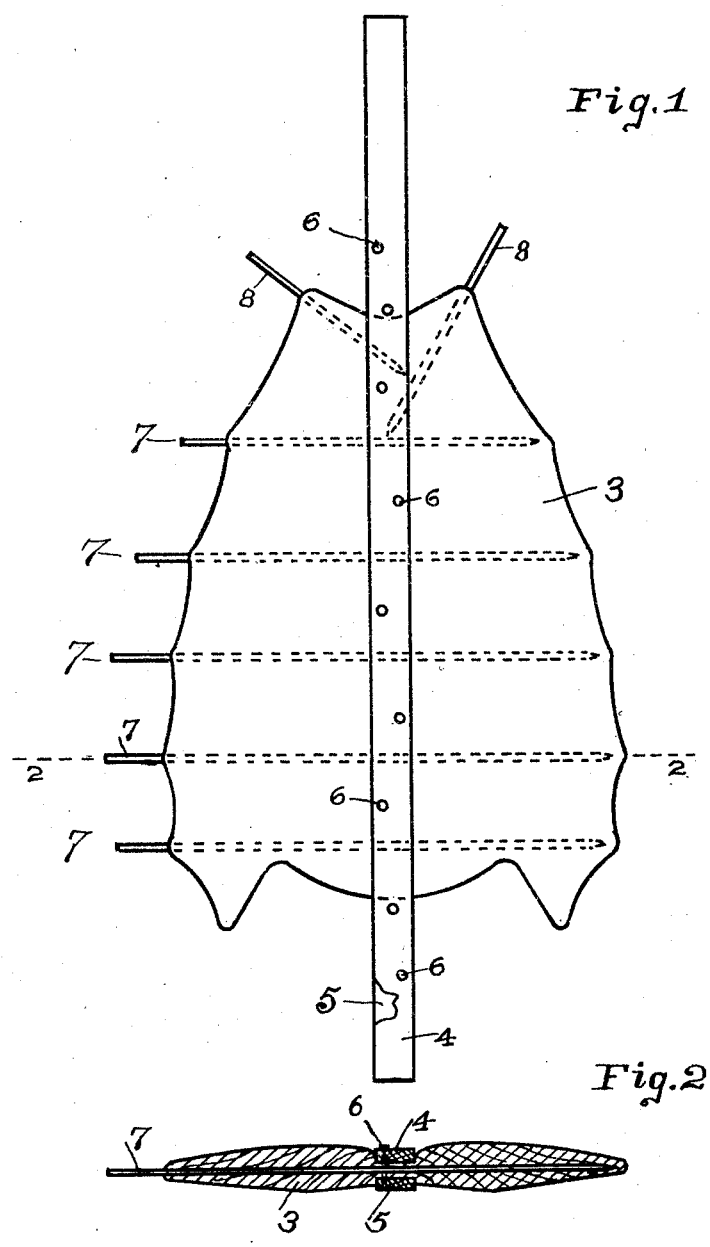
INVENTOR.
Sanford B. Mayhew
BY David E. Lain,
ATTORNEY.

Patented Sept. 11, 1928.

1,683,834

UNITED STATES PATENT OFFICE.

SANFORD B. MAYHEW, OF MARIETTA TOWNSHIP, WHATCOM COUNTY, WASHINGTON.

SPITS USED IN PREPARING SALMON FOR BARBECUE.

Application filed August 9, 1927. Serial No. 211,724.

My invention relates to an improvement in the spits used in preparing salmon, and other fish, for barbecue, and an object of my improvement is the provision for retaining the fish in a stretched flat position and a further object of my improvement is the provision for each fish with means to retain it at the desired height above the fire and in the desired angle of inclination against the central supporting pole.

I attain these and other objects of my improvement with the device illustrated in the accompanying sheet of drawings forming a part of this specification and showing the prepared fish in two views: Figure 1 being an elevation view of the outside of a prepared fish and Fig. 2, a cross section thereof on the line 2—2.

More particularly: A fish is cleaned by being first cut open from end to end midway of the belly, the viscera are removed and the head and tail cut off. The fish is then washed and the back bone is cut out and it is flattened out on a table as at 3. Two clamping sticks 5, 4 are placed below and above the body lengthwise in the middle thereof and secured thereto in any suitable way. By preference, I draw the two clamping sticks 5 and 4 closely together with small nails 6, 6 driven through both sticks. In this way the sticks are caused to bed themselves in the flesh of the fish and approach quite closely together. Sticks 4, 5 extend beyond the lower or head end, as shown, as far as it is desired to have this end of the fish above the ground while being subjected to smoke and heat of the fire and said clamping sticks extend beyond the upper, or tail end, far enough to reach the central supporting pole.

After the clamping sticks are properly secured in place skewers 7, 7, etc. are forced through the fish transversely and between sticks 4, 5 till their points nearly reach the opposite edge of the fish, as shown in dotted lines, causing said opposite edge to assume a scalloped shape, as indicated, and stretching that part of the fish flatly out from the clamp. When the skewers 7 are in place the edge of the fish through which they were introduced is drawn outward from the clamp over or on the skewers where it will remain with that edge also presenting a scalloped shape. In this way the main body of the fish is made flat and stretched sufficiently on the skewers to serve the purpose of this part of the preparations.

Shorter skewers 8, 8 are introduced into the tail end of the fish at the points thereof and said skewer points are forced between the clamping sticks substantially as shown in dotted lines. In this manner the tail end is held stretched and flat in the general plane of the fish through the same between clamping sticks 4, 5. Where the skewers pass between said sticks the flesh of the fish is compressed so that they are firmly held therebetween and the entire number of skewers 7, 8 are retained substantially in a plane and by them the fish is retained in the illustrated flat shape which is one of the objects sought.

After being thus clamped and skewered the flesh side of the fish has salt sprinkled thereover.

When a number of fish are to be simultaneously treated with the barbecue each is prepared as explained. A central pole is maintained at the desired distance above the ground in a horizontal position by nailing it to two uprights driven in the ground far enough apart to build a fire therebetween. Said fire is built of wood suited for producing both smoke and heat simultaneously and, when in suitable condition as to smoke and heat, the prepared fish are placed on both sides of said fire flatwise thereto in a single row on each side thereof with the lower ends of the clamping sticks resting on the ground and the upper ends thereof bearing on said central horizontal pole thus causing the two rows of fish to assume a slanting position over the fire. It may be found desirable to withdraw some of the fish to positions farther from certain hottest parts of the fire during the progress of the operation by setting the lower ends of the clamping sticks farther away than at first placed. But in general, the fish may remain in the described position till the smoking and cooking process is complete. They are then taken away from the fire, the skewers are all withdrawn and the fish is cut away from clamping sticks 4, 5 by passing a knife down through the fish closely to each side of said clamp. The two parts of the fish thus separated are the finished product of the barbecue according to my method, and are ready for serving.

My invention resides in the provision of clamping sticks 4 and 5 which, when used as disclosed, retain the longitudinal central part of the opened fish in a flat shape, extend beyond the fish at bottom and top to provide bottom and top supports for the fish and constitute receiving and holding means for the inner ends of skewers 7, 8; and further in combining said laterally and diagonally-placed skewers with said clamp when said fish is held therebetween.

I claim:

A device of the character described consisting of a pair of sticks suited to be disposed longitudinally on opposite sides of an opened fish and extend at both ends thereof beyond said fish, fastening means to draw and hold said sticks in clamping relation when said fish is therebetween, and skewers suited to be thrust laterally and diagonally through said opened body of said fish and into said body between said clamping sticks.

SANFORD B. MAYHEW.